US009343966B1

(12) United States Patent
Thakur

(10) Patent No.: US 9,343,966 B1
(45) Date of Patent: May 17, 2016

(54) VOLTAGE SWITCHING SYSTEM FOR INTEGRATED CIRCUIT

(71) Applicant: Nishant Singh Thakur, Indore (IN)

(72) Inventor: Nishant Singh Thakur, Indore (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/635,891

(22) Filed: Mar. 2, 2015

(51) Int. Cl.
*G05F 3/16* (2006.01)
*H02M 3/156* (2006.01)

(52) U.S. Cl.
CPC .................................. *H02M 3/156* (2013.01)

(58) Field of Classification Search
CPC ........... G05F 1/613; G05F 1/32; G05F 1/445; G05F 3/24; G05F 3/18; G05F 3/30; G05F 3/262; H02M 3/1588; H02M 2001/007; H02M 2001/0045; G06F 1/3203
USPC ......... 323/223–225, 249, 251, 265, 266, 268, 323/350, 311–317; 713/300, 310, 320, 324, 713/330, 340
See application file for complete search history.

(56) References Cited

U.S. PATENT DOCUMENTS

| 6,654,264 | B2 | 11/2003 | Rose |
| 6,809,504 | B2 | 10/2004 | Tang |
| 7,080,268 | B2 | 7/2006 | Mosley |
| 7,085,943 | B2 | 8/2006 | Chun et al. |
| 7,148,670 | B2 | 12/2006 | Inn |
| 7,167,041 | B2 | 1/2007 | Khalid |
| 7,301,313 | B1 | 11/2007 | Hart |
| 7,348,848 | B2 | 3/2008 | Huang |
| 7,397,228 | B2 | 7/2008 | Barrows |
| 7,518,355 | B2 | 4/2009 | Grassi |
| 7,608,942 | B2 | 10/2009 | Chun et al. |
| 7,679,344 | B2 | 3/2010 | Carlson et al. |
| 7,973,595 | B2 | 7/2011 | Kimura |
| 8,020,017 | B2 * | 9/2011 | Padhye ................. G06F 1/3203 713/300 |
| 8,022,684 | B2 | 9/2011 | Bitting |
| 8,080,897 | B1 | 12/2011 | Virutchapunt |
| 8,161,431 | B2 | 4/2012 | Buonpane et al. |
| 8,689,023 | B2 | 4/2014 | Gupta et al. |
| 2005/0024035 | A1 | 2/2005 | Tobaian |
| 2007/0271473 | A1 | 11/2007 | Hosomi |
| 2010/0164469 | A1 | 7/2010 | Bansal |
| 2011/0084552 | A1 | 4/2011 | Faerevaag |
| 2012/0194151 | A1 | 8/2012 | Gunther |
| 2012/0326517 | A1 | 12/2012 | Narwal |
| 2013/0021091 | A1 | 1/2013 | Robertson |
| 2013/0093505 | A1 | 4/2013 | Gupta et al. |
| 2013/0221937 | A1 | 8/2013 | Yan |

(Continued)

*Primary Examiner* — Nguyen Tran
(74) *Attorney, Agent, or Firm* — Charles E Bergere

(57) ABSTRACT

A voltage switching system for an integrated circuit (IC) operable in first and second operational modes includes a handover module, first and second voltage regulators, a switch driver, a transistor, and a comparator. When the IC transitions between modes, the handover module receives ramp control and hand-over start signals, generates comparator and bandwidth control signals based on the hand-over start signal and a ramp signal based on the ramp control signal. The switch driver generates a power control signal based on the comparator control signal and a gate input signal based on the ramp signal. The comparator compares first and second voltage signals based on the power control signal and generates a hand-over complete signal. The handover module generates a final hand-over complete signal based on the hand-over complete signal, indicative of completion of transition between the first and second operational modes.

20 Claims, 4 Drawing Sheets

(56) References Cited

U.S. PATENT DOCUMENTS

2015/0194886 A1* 7/2015 Zanetta ................ H02M 3/158 327/309

2016/0048147 A1* 2/2016 Abhishek ................ G05F 1/468 323/313

* cited by examiner

VOLTAGE SWITCHING SYSTEM FOR INTEGRATED CIRCUIT

BACKGROUND

The present invention relates generally to integrated circuits, and, more particularly, to a voltage switching system for an integrated circuit.

Integrated circuits (IC) include various analog and digital circuits such as operational amplifiers, voltage regulators, power management controllers (PMC), sensors, logic circuits, and non-volatile memories. These circuits may be active or inactive at various times depending on operational requirements. An IC may be configured to operate in various operational modes such as run, standby, wait, etc., with the various modes activating and inactivating these circuits.

To reduce power consumption, the IC may operate at different voltage levels and have circuit domains that operate at different voltage levels. To facilitate operation at different voltage levels, multiple voltage regulators are required. For example, the IC may include a high power voltage regulator that provides a high supply voltage signal at a high voltage level ($V_{HPVDD}$) and a low power voltage regulator that provides a low supply voltage signal at a low voltage level ($V_{ULPVDD}$). Then, in operation, the IC operates at the high voltage level in run mode and at the low voltage level in standby mode. The high voltage level $V_{HPVDD}$ could be, for example, 1.2V, and the low voltage level $V_{ULPVDD}$ 1.125V.

Circuits that are active in a particular operational mode are sometimes referred to as a domain, such as a high power domain and a low power domain. The high power domain may be active in the run mode and inactive in the standby mode, while the low power domain may be active in both the run and standby modes.

FIG. 1 is a schematic block diagram of a conventional voltage switching system 102 connected to an IC 104. The IC 104 is operable in multiple operational modes such as run and standby modes. The voltage switching system 102 includes a high power voltage regulator (HPREG) 106a, an ultra-low power voltage regulator (ULPREG) 106b, and a PMOS transistor 108. The IC 104 includes high and low power domains 110a and 110b. The HPREG 106a and the high power domain 110a are operable in the run mode and are switched off in the standby mode, and the ULPREG 106b and the low power domain 110b are operable when the IC 104 is in run and standby modes.

The HPREG 106a has a first input terminal connected to a reference voltage generator (not shown) for receiving a first reference voltage signal, a second input terminal for receiving a first regulated voltage signal, and an output terminal connected to its second input terminal for generating the first regulated voltage signal. The ULPREG 106b has a first input terminal connected to the reference voltage generator for receiving a second reference voltage signal, a second input terminal for receiving a second regulated voltage signal, and an output terminal connected to its second input terminal for generating the second regulated voltage signal. The first and second reference voltage signals are at a high voltage level $V_{HPVDD}$ and a low voltage level $V_{ULPVDD}$, respectively. The HPREG 106a generates the first regulated voltage signal at the high voltage level $V_{HPVDD}$, and the ULPREG 106b generates the second regulated voltage signal at the low voltage level $V_{ULPVDD}$.

The PMOS transistor 108 has a source terminal connected to the output terminal of the HPREG 106a for receiving the first regulated voltage signal, a gate terminal connected to a controller (not shown) for receiving a control signal, and a drain terminal connected to the output terminal of the ULPREG 106b for receiving the second regulated voltage signal. The controller is a PMC that generates the control signal when the IC transitions between the run and standby modes. The controller generates the control signal as a step voltage signal. The high and low power domains 110a and 110b are connected to the HPREG 106a and the ULPREG 106b for receiving the first and second regulated voltage signals, respectively.

When the IC 104 is in the run mode, the HPREG 106a provides the first regulated voltage signal to the high power domain 110a. The ULPREG 106b is switched off. The control signal generated by the controller is at a logic low state. The gate terminal of the transistor 108 receives the low control signal and the transistor 108 is switched on. As the transistor 108 is switched on, the HPREG 106a provides the first regulated voltage signal to the low power domain 110b. Thus, the HPREG 106a provides a first load current to the high and low power domains 110a and 110b.

When the IC 104 is in standby mode, the HPREG 106a is switched off, the ULPREG 106b provides the second regulated voltage signal to the low power domain 110b, and the control signal generated by the controller is at a logic high state. The gate terminal of the transistor 108 receives the high control signal and the transistor 108 is switched off. Thus, the high power domain 110a does not receive either of the first or the second regulated voltage signals and hence, is inactive. The ULPREG 106b provides a second load current to the low power domain 110b.

When the IC 104 transitions from the run mode to the standby mode, the HPREG 106a is switched off and the ULPREG 106b is switched on. It is well known in the art that the ULPREG 106b has a finite response time. The response time of the ULPREG 106b is defined as the time required by the ULPREG 106b for generating the second regulated voltage signal based on the second reference voltage signal. However, during the transition from the run mode to the standby mode, the HPREG 106a may be switched off before the ULPREG 106b generates the second regulated voltage signal. Thus, the ULPREG 106b is unable to generate the second load current required to power the low power domain 110b before the HPREG 106a is switched off. As a result, the low power domain 110b receives the second regulated voltage signal at a voltage level that is not within an operating voltage range of the IC 104, thereby causing the IC 104 to reset. Hence, there is a need to ensure that the transition between the operational modes of the IC does not result in a reset condition.

One known technique to overcome the aforementioned problem uses a capacitor (not shown) connected to the output terminal of the ULPREG 106b. When the IC 104 is in the run mode, the capacitor receives the first regulated voltage signal and stores a charge corresponding to the high voltage level $V_{HPVDD}$ of the first regulated voltage signal. When the IC 104 transitions from the run to standby mode, the capacitor discharges and provides the first regulated voltage signal at the high voltage level $V_{HPVDD}$ to the low power domain 110b for a short time period. This short time period corresponds to the discharge time period of the capacitor. During the discharge time period, the ULPREG 106b generates the second regulated voltage signal at the low voltage level $V_{ULPVDD}$ and provides the second regulated voltage signal to the low power domain 110b. However, the discharge time period may not be equal to the response time of the ULPREG 106b. Thus, there is a possibility of the IC 104 being reset due to a mismatch between the discharge time of the capacitor and response time of the ULPREG 106b. When the discharge time period is less than the response time of the ULPREG 106b, the ULPREG 106b is unable to generate the second load current to power the low power domain 110b before the capacitor discharges, thereby causing the IC 104 to reset.

Therefore it would be advantageous to have a voltage switching system that prevents a reset of the IC when the IC transitions between different operational modes.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
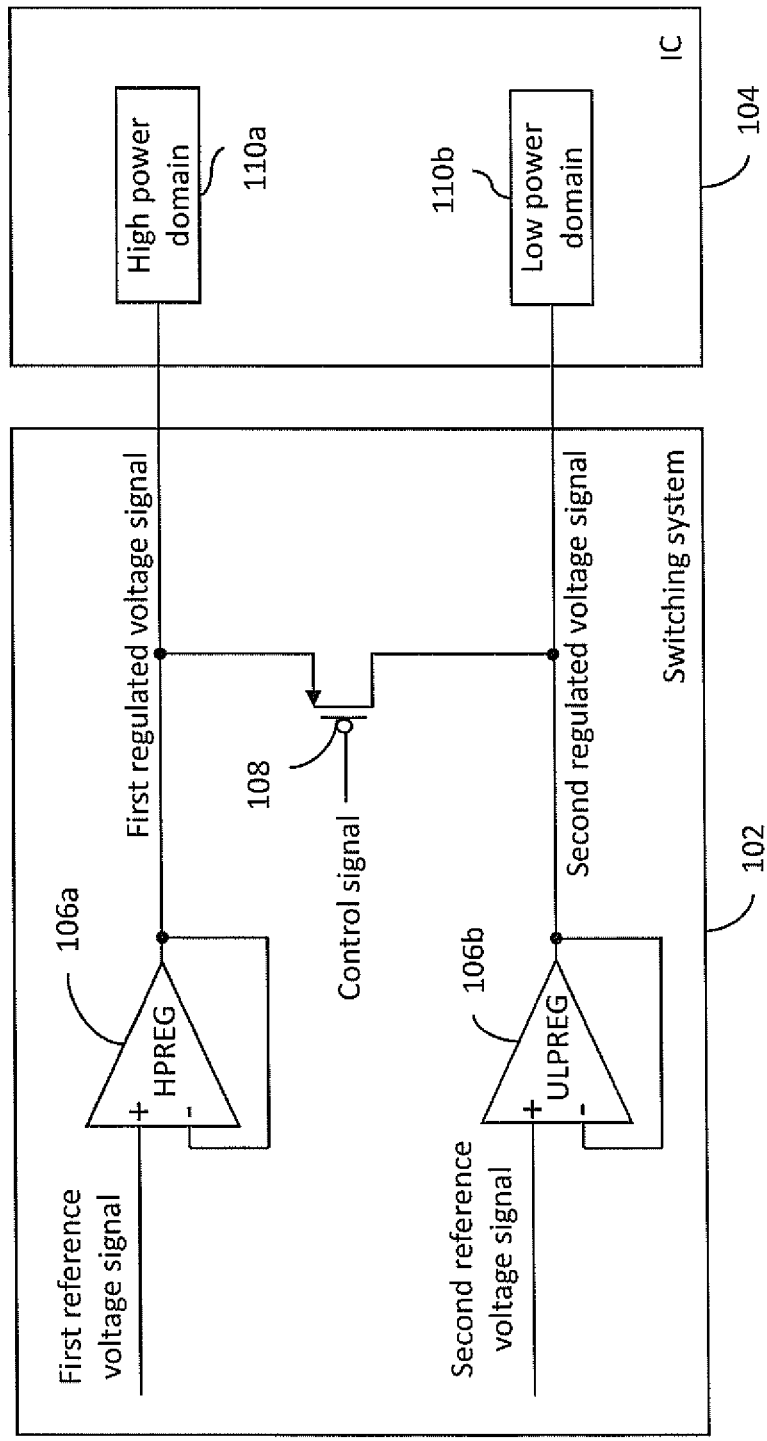
FIG. 1 is a schematic block diagram of a conventional voltage switching system connected to an integrated circuit.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a voltage switching system connected to an integrated circuit (IC) is provided. The IC is operable in at least first and second operational modes. The voltage switching system includes a handover module, first and second voltage regulators, a switch driver, a transistor, and a comparator. The handover module receives ramp control and handover start signals and a first voltage signal, generates first and second reference voltage signals, generates bandwidth control and comparator control signals based on the handover start signal, and a ramp signal based on the ramp control signal. Further, the handover module sets a voltage level of the second reference voltage signal based on the handover start signal and the first voltage signal. The first voltage regulator has a first input terminal for receiving the first reference voltage signal, a second input terminal for receiving the first voltage signal, and an output terminal for generating the first voltage signal based on the first reference voltage signal. The second voltage regulator has a first input terminal for receiving the second reference voltage signal, a second input terminal for receiving a second voltage signal, a third input terminal for receiving the bandwidth control signal, and an output terminal for generating the second voltage signal based on the second reference voltage signal. The switch driver receives the comparator control signal and the ramp signal and generates a power control signal based on the comparator control signal and a gate input signal based on the ramp signal. The transistor has a source terminal for receiving the first voltage signal, a gate terminal for receiving the gate input signal, and a drain terminal for receiving the second voltage signal. The comparator has a first input terminal for receiving the first voltage signal, a second input terminal for receiving the second voltage signal, and a third input terminal for receiving the power control signal. The comparator compares the first and second voltage signals based on the power control signal, determines a voltage difference between the first and second voltage signals, and generates a handover complete signal at an output terminal thereof based on the voltage difference.

In another embodiment of the present invention, an IC operable in first and second operational modes is provided. The IC includes a first power domain, a second power domain, a handover module, first and second voltage regulators, a switch driver, a transistor, and a comparator. The first domain receives a first voltage signal. The first domain is operable when the IC is in the first operational mode and when the IC transitions between the first and second operational modes. The first domain is switched off when the IC is in the second operational mode. The second domain receives a second voltage signal. The second domain is operable when the IC is in the first and second operational modes and when the IC transitions between the first and second operational modes. The handover module receives ramp control and handover start signals and the first voltage signal, generates first and second reference voltage signals, generates bandwidth control and comparator control signals based on the handover start signal, and a ramp signal based on the ramp control signal, and sets a voltage level of the second reference voltage signal based on the handover start signal and the first voltage signal. The first voltage regulator has a first input terminal for receiving the first reference voltage signal, a second input terminal for receiving the first voltage signal, and an output terminal for generating the first voltage signal based on the first reference voltage signal. The second voltage regulator has a first input terminal for receiving the second reference voltage signal, a second input terminal for receiving the second voltage signal, a third input terminal for receiving the bandwidth control signal, and an output terminal for generating the second voltage signal based on the second reference voltage signal. The switch driver receives the comparator control signal and the ramp signal and generates a power control signal based on the comparator control signal and a gate input signal based on the ramp signal. The transistor has a source terminal for receiving the first voltage signal, a gate terminal for receiving the gate input signal, and a drain terminal for receiving the second voltage signal. The comparator has a first input terminal for receiving the first voltage signal, a second input terminal for receiving the second voltage signal, and a third input terminal for receiving the power control signal. The comparator compares the first and second voltage signals based on the power control signal, determines a voltage difference between the first and second voltage signals, and generates a handover complete signal at an output terminal thereof based on the voltage difference.

Various embodiments of the present invention provide a voltage switching system connected to an integrated circuit (IC), wherein the IC is operable in first and second operational modes. The voltage switching system includes a handover module, first and second voltage regulators, a switch driver, a transistor, and a comparator. The handover module receives ramp control and handover start signals and a first voltage signal, generates first and second reference voltage signals, generates bandwidth control and comparator control signals based on the handover start signal, and a ramp signal based on the ramp control signal, and sets a voltage level of the second reference voltage signal based on the handover start signal and the first voltage signal. The first voltage regulator receives the first reference voltage signal and generates the first voltage signal based on the first reference voltage signal. The second voltage regulator receives the second reference voltage signal and the bandwidth control signal and generates the second voltage signal based on the second reference voltage signal. The switch driver receives the comparator control signal and the ramp signal and generates a power control signal based on the comparator control signal and a gate input signal based on the ramp signal. The transistor has a source terminal for receiving the first voltage signal, a gate terminal for receiving the gate input signal, and a drain terminal for receiving the second voltage signal. The comparator compares the first and second voltage signals based on the power control signal, determines a voltage difference between the first and second voltage signals, and generates a handover complete signal based on the voltage difference. An operational bandwidth of the second voltage regulator increases based on the bandwidth control signal, and consequently, a response time thereof decreases. Further, as the resistance of the transistor changes gradually, the first and second voltage regulators get sufficient time to generate the first and second voltage signals during the transition of the IC between the first and second operational modes. Hence, the IC does not reset during the transition between the first and second operational modes. Further, the handover module provides a final handover complete signal to the IC based on the handover complete signal. Hence, the IC receives an indication of successful transition between the first and second operational modes.

Figure 2:
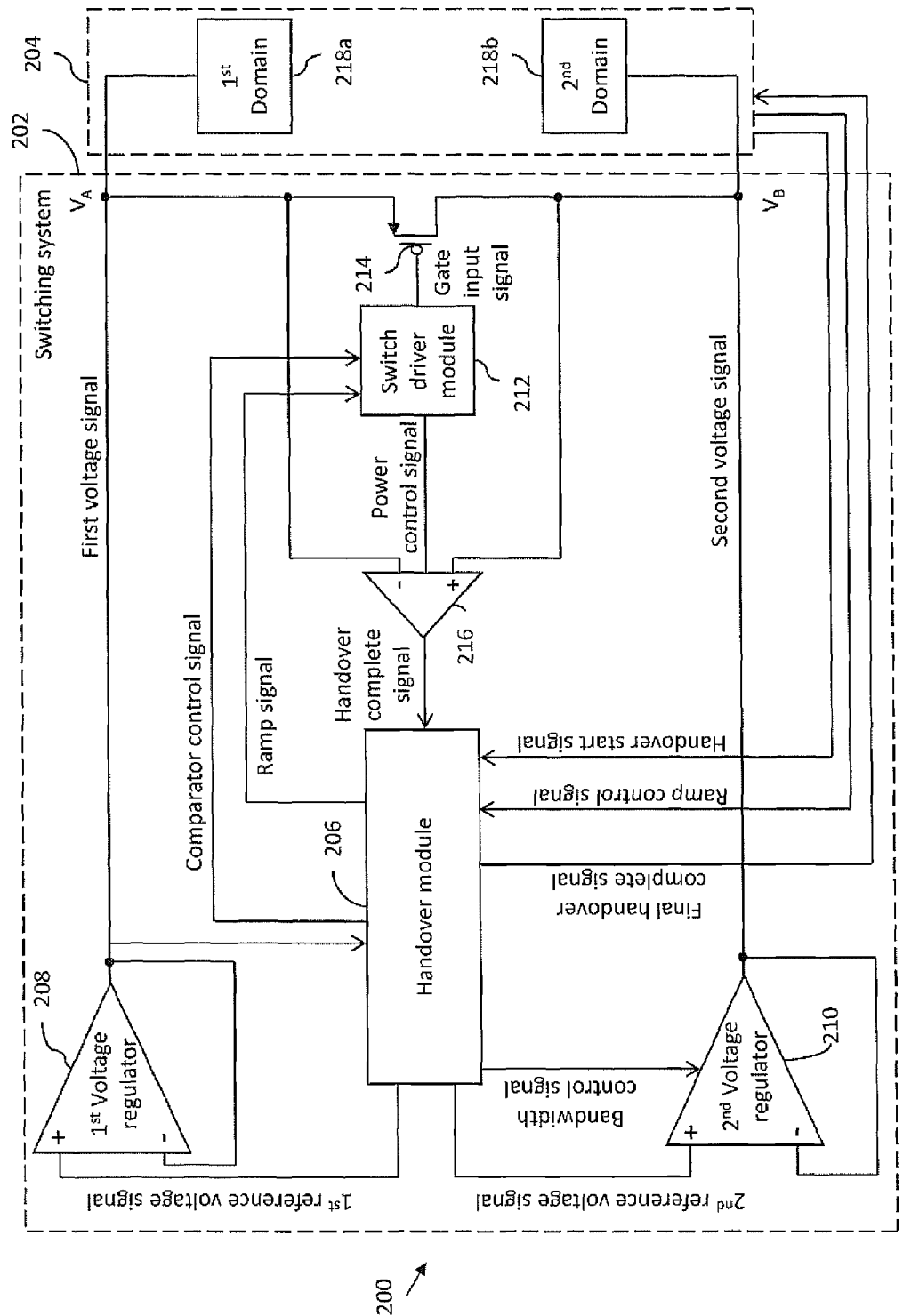
FIG. 2 is a schematic block diagram of an integrated circuit that includes a voltage switching system in accordance with an embodiment of the present invention.

Referring now to FIG. 2, a schematic block diagram of a first integrated circuit (IC) 200 that includes a voltage switching system 202 in accordance with an embodiment of the present invention is shown. The first IC 200 further includes a second IC 204 connected to the voltage switching system 202. The second IC 204 is operable in at least first and second operational modes (e.g., standby and run modes). The voltage switching system 202 facilitates smooth transitioning of the second IC 204 between the multiple operational modes. The voltage switching system 202 includes a handover module 206, a first voltage regulator 208 (also referred to as "high power regulator" or "HPREG"), a second voltage regulator 210 (also referred to as "ultra-low power regulator" or "ULPREG"), a switch driver 212, a transistor 214, and a comparator 216. The second IC 204 includes first and second power domains 218a and 218b. In an embodiment of the present invention, the first and second operational modes are run and standby modes, respectively.

The first and second domains 218a and 218b include first and second sets of circuits, such as operational amplifiers, voltage regulators, power management controllers (PMC), sensors, logic circuits, and non-volatile memories (not shown). When the second IC 204 is in the run mode, the first and second domains 218a and 218b are active, and when the second IC 204 is in the standby mode, the first domain 218a is inactive and the second domain 218b is active. When the second IC 204 transitions from the run mode to the standby mode, the first and second domains 218a and 218b are active.

The first domain 218a is connected to the HPREG 208 for receiving a first voltage signal at a high voltage level $V_{HPVDD}$. The first domain 218a is a high power domain. The second domain 218b is connected to the ULPREG 210 for receiving a second voltage signal at a low voltage level $V_{ULPVDD}$. The second domain 218b is a low power domain. Further, the second IC 204 generates ramp control and handover start signals. The second IC 204 generates the handover start signal to indicate an initialization of the transition between the run and standby modes of the second IC 204.

The handover module 206 is connected to the HPREG and ULPREG 208 and 210, the switch driver 212, the comparator 216, and the second IC 204. The handover module 206 receives the handover start signal from the second IC 204. The handover module 206 further receives the ramp control signal and the first voltage signal from the second IC 204 and the HPREG 208, respectively. The handover module 206 generates first and second reference voltage signals. In an example, the handover module 206 includes first and second reference voltage generators (not shown) that generate the first and second reference voltage signals. The handover module 206 generates a ramp signal based on the ramp control signal and generates comparator control and bandwidth control signals based on the handover start signal. The ramp control signal is indicative of a magnitude and a time period of the ramp signal. Thus, the second IC 204 generates the ramp control signal to control the ramp-up or ramp-down rate of the ramp signal. In an example, the handover module 206 generates the comparator control and bandwidth control signals at logic high state based on the handover start signal. The ramp signal is either an increasing or a decreasing ramp voltage signals.

The handover module 206 sets a voltage level of the second reference voltage signal at an intermediate reference voltage level based on the handover start signal and the first voltage signal. When the second IC 204 transitions from the run mode to the standby mode, the intermediate reference voltage level corresponds to a sum of the high voltage level $V_{HPVDD}$ and a delta voltage level. Thus, the intermediate reference voltage level is higher than the high voltage level $V_{HPVDD}$.

When the second IC 204 transitions from the standby mode to the run mode, the intermediate reference voltage level corresponds to a difference between the high voltage level $V_{HPVDD}$ and the delta voltage level. Thus, the intermediate reference voltage level is less than the high voltage level $V_{HPVDD}$. In an example, the delta voltage is equal to an offset voltage of the ULPREG 210. Further, it will be apparent to a person skilled in the art that a delta voltage level when the second IC 204 transitions from the run mode to the standby mode may differ from another delta voltage level when the second IC 204 transitions from the standby mode to the run mode.

The HPREG 208 has a first input terminal connected to the handover module 206 for receiving the first reference voltage signal, a second input terminal for receiving the first voltage signal, and an output terminal for generating the first voltage signal based on the first reference voltage signal. The HPREG 208 has a large operational bandwidth. The HPREG 208 is switched on when the second IC 204 operates in the run mode and when the second IC 204 transitions from the run mode to the standby mode. The HPREG 208 is switched off when the second IC 204 operates in the standby mode. The HPREG 208 regulates the first voltage signal at a voltage level of the first reference voltage signal. As the operational bandwidth of the HPREG 208 is large, the response time of the HPREG 208 is less.

The ULPREG 210 has a first input terminal connected to the handover module 206 for receiving the second reference voltage signal, a second input terminal for receiving the second voltage signal, a third input terminal connected to the handover module 206 for receiving the bandwidth control signal, and an output terminal for generating the second voltage signal based on the second reference voltage signal. The ULPREG 210 has a low operational bandwidth. The ULPREG 210 is switched on when the second IC 204 operates in the run and standby modes and when the second IC 204 transitions from the run mode to the standby mode. The ULPREG 210 regulates the second voltage signal at a voltage level of the second reference voltage signal. As the operational bandwidth of the ULPREG 210 is low, the response time of the ULPREG 210 is considerably high.

In an embodiment of the present invention, the operational bandwidth of the ULPREG 210 increases when the bandwidth control signal is at logic high state and decreases when the bandwidth control signal is at logic low state. When the operational bandwidth of the ULPREG 210 increases, the response time of the ULPREG 210 decreases. Thus, the time required for the ULPREG 210 to regulate the second voltage signal at a voltage level of the second reference voltage signal is reduced, thereby facilitating faster transition between the operational modes of the second IC 204. When the second IC 204 successfully transitions between the operational modes, the operational bandwidth of the ULPREG 210 is reduced.

The switch driver 212 is connected to the handover module 206, the transistor 214, and the comparator 216. The switch driver 212 receives the ramp signal and the comparator control signal and generates a power control signal and a gate input signal based on the comparator control signal and the ramp signal, respectively. In an example, the switch driver 212 generates the power control signal at logic high state when the comparator control signal is at logic high state, and generates the power control signal at logic low state when the comparator control signal is at logic low state. In an example, when the second IC 204 transitions from the run mode to the standby mode, the gate input signal is an increasing ramp voltage signal. When the second IC 204 transitions from the standby mode to the run mode, the gate input signal is a decreasing ramp voltage signal. When the second IC 204 is in the run mode, the gate input signal is at logic low state and when the second IC 204 is in the standby mode, the gate input signal is at logic high state.

The transistor 214 has a source terminal connected to the output terminal of the HPREG 208 for receiving the first voltage signal, a gate terminal connected to the switch driver 212 for receiving the gate input signal, and a drain terminal connected to the output terminal of the ULPREG 210 for receiving the second voltage signal. In an example, the transistor 214 is a p-channel metal oxide semiconductor field effect transistor (PMOS). It will be apparent to a person skilled in the art that in another embodiment of the present invention, the transistor 214 may be an n-channel metal oxide semiconductor field effect transistor (NMOS).

The comparator 216 has a first input terminal connected to the source terminal of the transistor 214 for receiving the first voltage signal, a second input terminal connected to the drain terminal of the transistor 214 for receiving the second voltage signal, a third input terminal connected to the switch driver 212 for receiving the power control signal, and an output terminal connected to the handover module 206 for generating a handover complete signal. The comparator 216 compares voltage levels of the first and second voltage signals based on the power control signal to determine a voltage difference between the voltage levels of the first and second voltage signals. In an example, the comparator 216 compares the voltage levels of the first and second voltage signals when the power control signal is at logic high state and ceases to compare the first and second voltage signals when the power control signal is at logic low state. The comparator 216 determines magnitude and polarity of the voltage difference between the voltage levels of the first and second voltage signals. The comparator 216 generates the handover complete signal based on the voltage difference. In one embodiment, the comparator 216 generates the handover complete signal when the polarity of the voltage difference is reversed.

In another embodiment, the comparator 216 is a skewed comparator, i.e., the comparator 216 generates the handover complete signal based on a skew voltage. The skew voltage is indicative of a minimum difference in the voltage levels of the first and second voltage signals. When the polarity of the voltage difference is reversed and the magnitude of the voltage difference exceeds the skew voltage, the comparator 216 generates the handover complete signal. In an example, the second IC 204 configures the skew voltage.

The handover module 206 receives the handover complete signal and generates a final handover complete signal based on the handover complete signal. The second IC 204 is connected to the handover module 206 and receives the final handover complete signal. The final handover complete signal indicates to the second IC 204 that the transition from the run mode to the standby mode is complete. Subsequently, the handover module 206 sets the voltage level of the second reference voltage signal at a final reference voltage level based on the handover complete signal. The final reference voltage level is less than the high voltage level $V_{HPVDD}$. The handover module 206 further generates the comparator control and bandwidth control signals at logic low state based on the handover complete signal. In an example, the final reference voltage level is equal to the low voltage level $V_{ULPVDD}$.

Figure 3A:
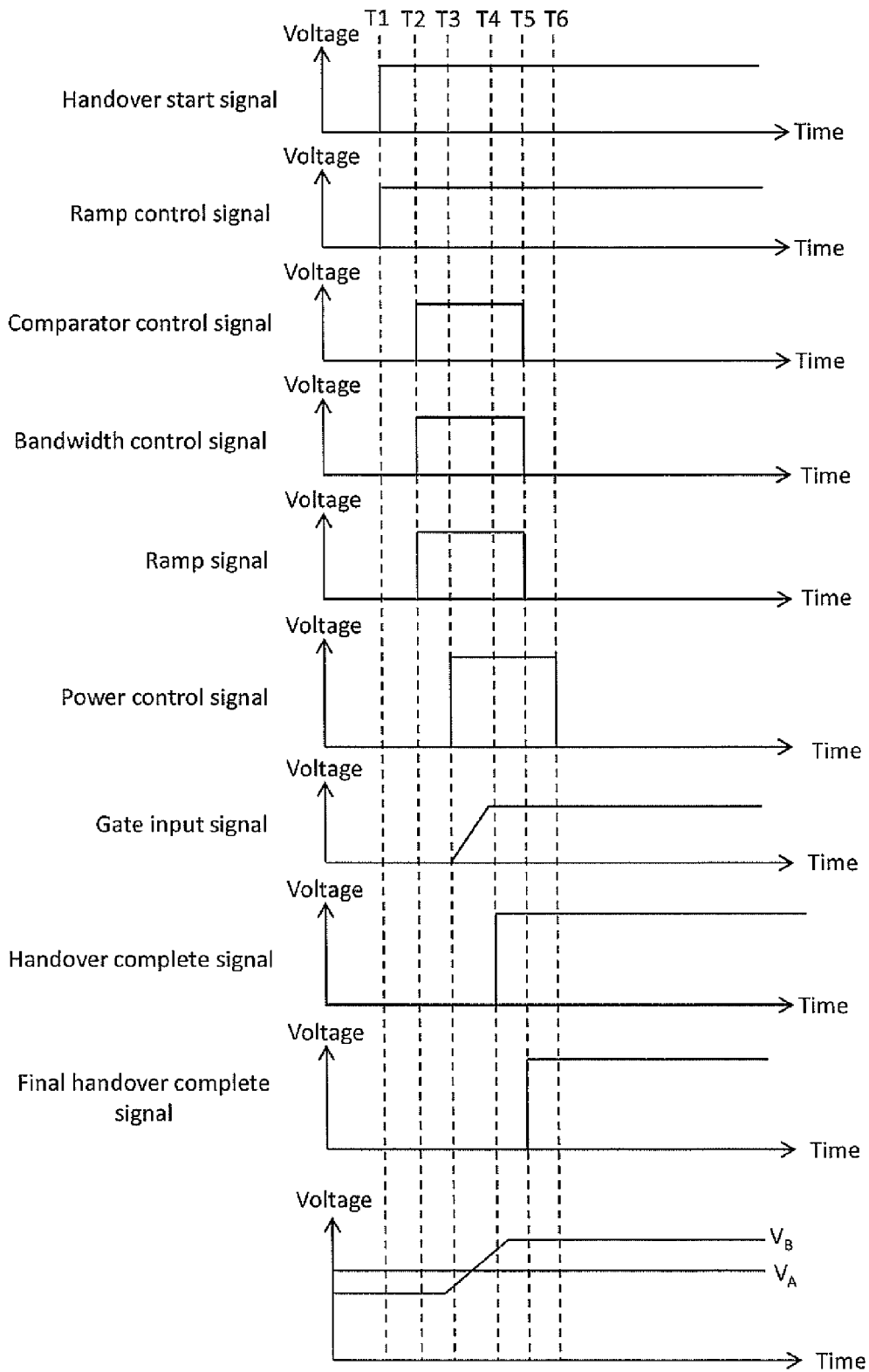
FIGS. 3A and 3B are timing diagrams illustrating a plurality of signals of the voltage switching system of FIG. 2 in accordance with an embodiment of the present invention.
Figure 3B:
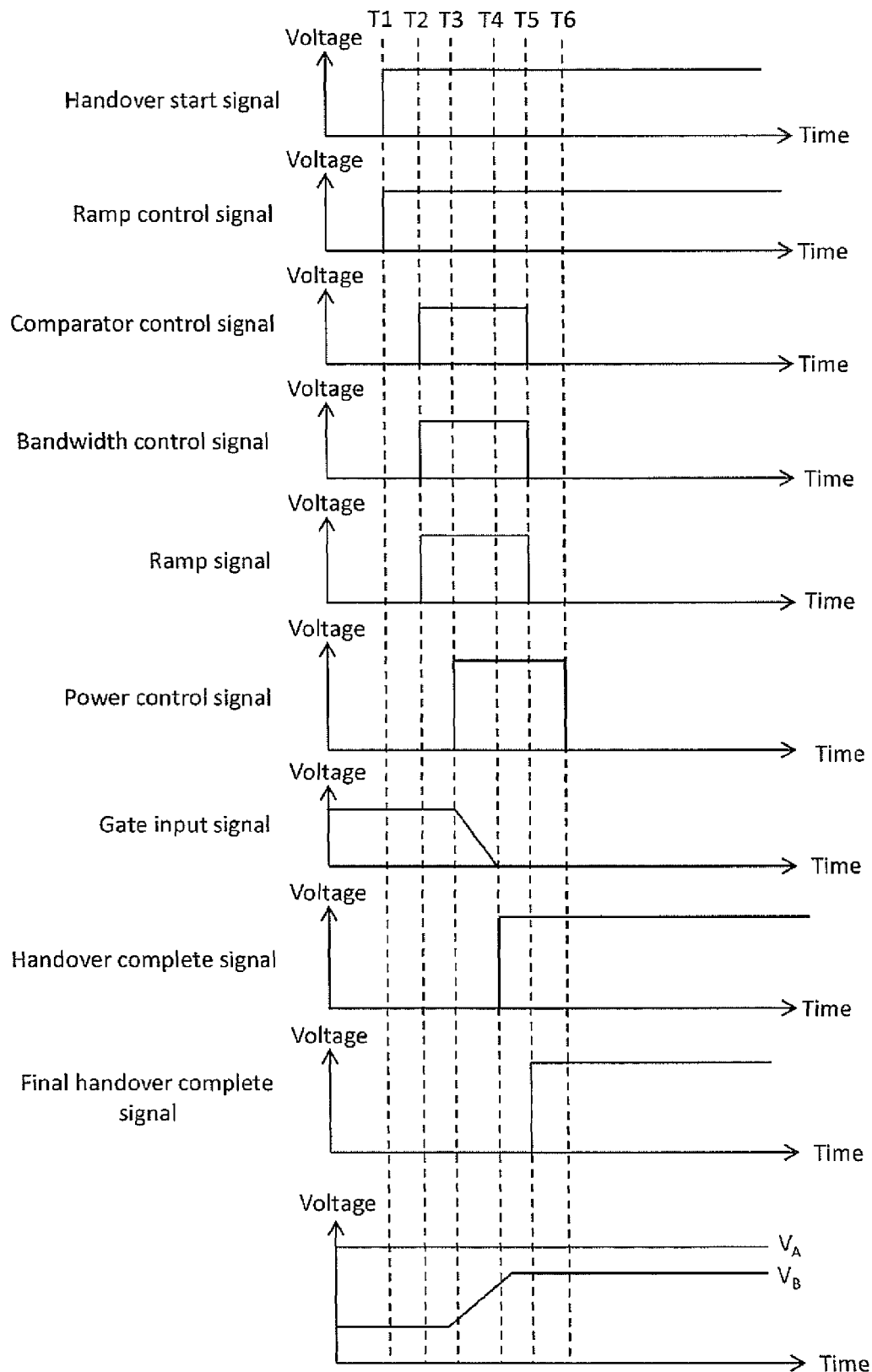

Referring now to FIGS. 3A and 3B, timing diagrams illustrating a plurality of signals of the voltage switching system 202 in accordance with an embodiment of the present invention are shown.

FIG. 3A illustrates the handover start signal, the ramp control signal, the comparator control signal, the bandwidth control signal, the ramp signal, the power control signal, the gate input signal, the handover complete signal, the final handover complete signal, the first voltage signal (also referred to as voltage VA), and the second voltage signal (also referred to as voltage VB) of the voltage switching system 202 when the second IC 204 transitions from the run mode to the standby mode. The second IC 204 generates the handover start signal indicative of the transition of the second IC 204 from the run mode to the standby mode.

In operation, at time T1, the handover module 206 receives the ramp control signal, the handover start signal, and the first voltage signal. The handover module 206 generates the first and second reference voltage signals. At time T2, the handover module 206 generates the bandwidth control and comparator control signals at logic high state based on the handover start signal, and the ramp signal at logic high state based on the ramp control signal. Further, the handover module 206 sets the voltage level of the second reference voltage signal to the intermediate reference voltage level based on the handover start signal and the first voltage signal. The HPREG 208 receives the first reference voltage signal and the first voltage signal and generates the first voltage signal based on the first reference voltage signal. The ULPREG 210 receives the second reference voltage signal, the second voltage signal, and the bandwidth control signal and generates the second voltage signal based on the second reference voltage signal. The ULPREG 210 increases the operational bandwidth thereof based on the logic high bandwidth control signal. The switch driver 212 receives the logic high comparator control signal and the ramp signal and at time T3, the switch driver 212 generates the power control signal at logic high state and an increasing ramp voltage gate input signal.

The transistor 214 receives the first voltage signal, the increasing ramp voltage gate input signal, and the second voltage signal. The comparator 216 receives the first voltage signal, the second voltage signal, and the logic high power control signal, compares the first and second voltage signals, and determines the voltage difference in voltage levels of the first and second voltage signals. At time T4, the voltage level of the second voltage signal VB is higher than the voltage level of the first voltage signal VA. Hence, at time T4, the comparator 216 generates the handover complete signal at logic high state based on the voltage difference.

The handover module 206 receives the logic high handover complete signal and generates the final handover complete signal at logic high state at time T5. Further, at time T5, the handover module 206 generates the comparator and bandwidth control signals and the ramp control signal at logic low state based on the logic high handover complete signal. The ULPREG 210 reduces the operational bandwidth thereof based on the logic low bandwidth control signal. At time T6, the switch driver 212 generates the power control signal at logic low state based on the logic low comparator control signal. Thus, the comparator 216 ceases to compare the first and second voltage signals based on the logic low power control signal.

FIG. 3B illustrates the handover start signal, the ramp control signal, the comparator control signal, the bandwidth control signal, the ramp signal, the power control signal, the gate input signal, the handover complete signal, the final handover complete signal, the first voltage signal (also referred to as voltage VA), and the second voltage signal (also referred to as voltage VB) of the voltage switching system 202 when the second IC 204 transitions from the standby mode to the run mode is shown. The second IC 204 generates the handover start signal indicative of the transition of the second IC 204 from the standby mode to the run mode.

In operation, at time T1, the handover module 206 receives the ramp control signal, the handover start signal, and the first voltage signal. The handover module 206 generates the first and second reference voltage signals. At instance T2, the handover module 206 generates the bandwidth control and comparator control signals at logic high state based on the handover start signal, and the ramp signal at logic high state based on the ramp control signal. Further, the handover module 206 sets the voltage level of the second reference voltage signal to the intermediate reference voltage level based on the handover start signal and the first voltage signal. The HPREG 208 receives the first reference voltage signal and the first voltage, and generates the first voltage signal based on the first reference voltage signal. The ULPREG 210 receives the second reference voltage signal, the second voltage signal, and the bandwidth control signal and generates the second voltage signal based on the second reference voltage signal. The ULPREG 210 increases the operational bandwidth thereof based on the logic high bandwidth control signal. The switch driver 212 receives the logic high comparator control signal and the ramp signal and generates the power control signal at logic high state and a decreasing ramp voltage gate input signal at time T3.

The transistor 214 receives the first voltage signal, the decreasing ramp voltage gate input signal, and the second voltage signal at the drain terminal thereof. The comparator 216 receives the first voltage signal, the second voltage signal, and the power control signal, compares the first and second voltage signals, and determines the voltage difference in voltage levels of the first and second voltage signals. At time T4, the voltage level of the first voltage signal VA is higher than the voltage level of the second voltage signal VB. Hence, at time T4, the comparator 216 generates the handover complete signal at logic high state based on the voltage difference.

The handover module 206 receives the logic high handover complete signal and generates the final handover complete signal at logic high state at time instance T5. Further, at time T5, the handover module 206 generates the comparator and bandwidth control signals and the ramp control signal at logic low state based on the logic high handover complete signal. The ULPREG 210 reduces the operational bandwidth thereof based on the logic low bandwidth control signal. At time T6, the switch driver 212 generates the power control signal at logic low state based on the logic low comparator control signal. Thus, the comparator 216 ceases to compare the first and second voltage signals based on the logic low power control signal.

The ULPREG 210 is a low bandwidth regulator. Low bandwidth regulators occupy less area and hence, the overall area of the voltage switching system 202 is reduced. The resistance of the transistor 214 gradually increases when the gate input signal receives the increasing ramp voltage signal. Similarly, the resistance of the transistor 214 gradually decreases when the gate input signal receives the decreasing ramp voltage signal. The gradual increase and decrease of the resistance of the transistor 214 provides sufficient time for switching off and on of the HPREG 208 and the ULPREG 210 during the transition between the run and standby modes. As the response time of the ULPREG 210 is decreased based on the logic high bandwidth control signal, the voltage level of the second voltage signal does not exceed the operating voltage range of the second IC 204. Thus, the second IC 204 does not reset when the second IC 204 transitions between the run and standby modes.

Further, the second IC 204 controls the magnitude and the time period of the increasing and decreasing ramp voltage signals by way of the ramp control signal, thereby allowing the second IC 204 to control the transition between the run and standby modes. The voltage switching system 202 does not include a capacitor to control the transition of the second IC 204. Thus, the area of the voltage switching system 202 is reduced. The voltage switching system 202 indicates to the second IC 204 that the completion of the transition between the run and standby modes. The skewed comparator provides safety against false reset of the second IC 204.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A voltage switching system connected to an integrated circuit (IC), wherein the IC is operable in first and second operational modes, the voltage switching system comprising:

a handover module for receiving ramp control and handover start signals and a first voltage signal, generating first and second reference voltage signals, generating bandwidth control and comparator control signals based on the handover start signal, and a ramp signal based on the ramp control signal, and setting a voltage level of the second reference voltage signal based on the handover start signal and the first voltage signal;

a first voltage regulator having a first input terminal connected to the handover module for receiving the first reference voltage signal, a second input terminal for receiving the first voltage signal, and an output terminal connected to the handover module for generating the first voltage signal based on the first reference voltage signal when the IC is in the first operational mode and when the IC transitions between the first and second operational modes, wherein the first voltage regulator is switched off when the IC is in the second operational mode;

a second voltage regulator having a first input terminal connected to the handover module for receiving the second reference voltage signal, a second input terminal for receiving a second voltage signal, a third input terminal connected to the handover module for receiving the bandwidth control signal, and an output terminal for generating the second voltage signal based on the second reference voltage signal when the IC is in the first and second operational modes and when the IC transitions between the first and second operational modes;

a switch driver connected to the handover module for receiving the comparator control signal and the ramp signal, and for generating a power control signal based on the comparator control signal, and a gate input signal based on the ramp signal;

a transistor having a source terminal connected to the output terminal of the first voltage regulator for receiving the first voltage signal, a gate terminal connected to the switch driver for receiving the gate input signal, and a drain terminal connected to the output terminal of the second voltage regulator for receiving the second voltage signal; and a comparator having a first input terminal connected to the source terminal of the transistor for receiving the first voltage signal, a second input terminal connected to the drain terminal of the transistor for receiving the second voltage signal, a third input terminal connected to the switch driver for receiving the power control signal, wherein the comparator compares the first and second voltage signals based on the power control signal, determines a voltage difference between the first and second voltage signals, and generates a handover complete signal at an output terminal thereof based on the voltage difference.

2. The voltage switching system of claim 1, wherein the handover module generates the bandwidth control and comparator control signals at a first logic state based on the handover start signal, and wherein the handover start signal is indicative of transition of the IC between the first and second operational modes.

3. The voltage switching system of claim 2, wherein the handover module is further connected to the output terminal of the comparator, and receives the handover complete signal, generates a final handover complete signal based on the handover complete signal indicative of completion of transition of the IC between the first and second operational modes, and generates the comparator control and bandwidth control signals at a second logic state based on the handover complete signal.

4. The voltage switching system of claim 3, wherein the second voltage regulator increases an operational bandwidth thereof when the bandwidth control signal is at the first logic state, and wherein the second voltage regulator decreases the operational bandwidth when the bandwidth control signal is at the second logic state.

5. The voltage switching system of claim 4, wherein the switch driver receives the comparator control signal and generates the power control signal at the first logic state when the comparator control signal is at the first logic state, and generates the power control signal at the second logic state when the comparator control signal is at the second logic state.

6. The voltage switching system of claim 5, wherein the comparator stops comparing the first and second voltage signals when the power control signal is at the second logic state.

7. The voltage switching system of claim 4, wherein the handover module further generates the second reference voltage signal at an intermediate reference voltage level based on the handover start signal and the first voltage signal, and at a final reference voltage level based on the handover complete signal, wherein the final reference voltage level is less than a voltage level of the first voltage signal.

8. The voltage switching system of claim 7, wherein the second voltage regulator regulates the second voltage signal at the intermediate reference voltage level when the bandwidth control signal is at the first logic state and regulates the second voltage signal at the final reference voltage level when the bandwidth control signal is at the second logic state.

9. The voltage switching system of claim 7, wherein the intermediate reference voltage level is higher than the voltage level of the first voltage signal when the IC transitions from the first to the second operational mode.

10. The voltage switching system of claim 7, wherein the intermediate reference voltage level is less than the voltage level of the first voltage signal when the IC transitions from the second to the first operational mode.

11. An integrated circuit (IC) operable in first and second operational modes, comprising:

a first domain that receives a first voltage signal, wherein the first domain is operable when the IC is in the first operational mode and when the IC transitions between the first and second operational modes, and wherein the first domain is switched off when the IC is in the second operational mode;

a second domain that receives a second voltage signal, wherein the second domain is operable when the IC is in the first and second operational modes and when the IC transitions between the first and second operational modes;

a handover module for receiving ramp control and handover start signals and the first voltage signal, generating first and second reference voltage signals, generating bandwidth control and comparator control signals based on the handover start signal, and a ramp signal based on the ramp control signal, and setting a voltage level of the second reference voltage signal based on the handover start signal and the first voltage signal;

a first voltage regulator having a first input terminal connected to the handover module for receiving the first reference voltage signal, a second input terminal for receiving the first voltage signal, and an output terminal connected to the handover module for generating the first voltage signal based on the first reference voltage signal when the IC is in the first operational mode and when the IC transitions between the first and second operational modes, wherein the first voltage regulator is switched off when the IC is in the second operational mode;

a second voltage regulator having a first input terminal connected to the handover module for receiving the second reference voltage signal, a second input terminal for receiving the second voltage signal, a third input terminal connected to the handover module for receiving the bandwidth control signal, and an output terminal for generating the second voltage signal based on the second reference voltage signal when the IC is in the first and second operational modes and when the IC transitions between the first and second operational modes;

a switch driver connected to the handover module for receiving the comparator control signal and the ramp signal, for generating a power control signal based on the comparator control signal, and for generating a gate input signal based on the ramp signal;

a transistor having a source terminal connected to the output terminal of the first voltage regulator for receiving the first voltage signal, a gate terminal connected to the switch driver for receiving the gate input signal, and a drain terminal connected to the output terminal of the second voltage regulator for receiving the second voltage signal; and a comparator having a first input terminal connected to the source terminal of the transistor for receiving the first voltage signal, a second input terminal connected to the drain terminal of the transistor for receiving the second voltage signal, a third input terminal connected to the switch driver for receiving the power control signal, wherein the comparator compares the first and second voltage signals based on the power control signal, determines a voltage difference between the first and second voltage signals, and generates a handover complete signal at an output terminal thereof based on the voltage difference.

12. The IC of claim 11, wherein the handover module generates the bandwidth control and comparator control signals at a first logic state based on the handover start signal, and wherein handover start signal is indicative of transition of the IC between the first and second operational modes.

13. The IC of claim 12, wherein the handover module is further connected to the output terminal of the comparator for receiving the handover complete signal, for generating a final handover complete signal based on the handover complete signal indicative of completion of transition of the IC between the first and second operational modes, and generating the comparator control and bandwidth control signals at a second logic state based on the handover complete signal.

14. The IC of claim 13, wherein the second voltage regulator increases an operational bandwidth thereof when the bandwidth control signal is at the first logic state, and wherein the second voltage regulator decreases the operational bandwidth when the bandwidth control signal is at the second logic state.

15. The IC of claim 14, wherein the switch driver receives the comparator control signal and generates the power control signal at the first logic state when the comparator control signal is at the first logic state, and generates the power control signal at the second logic state when the comparator control signal is at the second logic state.

16. The IC of claim 15, wherein the comparator stops comparing the first and second voltage signals when the power control signal is at the second logic state.

17. The IC of claim 14, wherein the handover module further generates the second reference voltage signal at an intermediate reference voltage level based on the handover start signal and the first voltage signal and at a final reference voltage level based on the handover complete signal, wherein the final reference voltage level is less than a voltage level of the first voltage signal.

18. The IC of claim 17, wherein the second voltage regulator regulates the second voltage signal at the intermediate reference voltage level when the bandwidth control signal is at the first logic state and regulates the second voltage signal at the final reference voltage level when the bandwidth control signal is at the second logic state.

19. The IC of claim 17, wherein the intermediate reference voltage level is higher than the voltage level of the first voltage signal when the IC transitions from the first to the second operational mode.

20. The IC of claim 17, wherein the intermediate reference voltage level is less than the voltage level of the first voltage signal when the IC transitions from the second to the first operational mode.

* * * * *